United States Patent [19]
Fuhrmann et al.

[11] 3,758,581
[45] Sept. 11, 1973

[54] PROCESS FOR THE MANUFACTURE OF KETONE DERIVATIVES

[75] Inventors: Robert Fuhrmann, Morris Plains; Stylianos Sifniades, Madison; Allen Abraham Tunick, Denville, all of N.J.

[73] Assignee: Allied Chemical Corporation, New York, N.Y.

[22] Filed: Mar. 24, 1972

[21] Appl. No.: 237,886

Related U.S. Application Data

[63] Continuation-in-part of Ser. No. 852,881, Aug. 25, 1969, abandoned.

[52] U.S. Cl........ 260/566 A, 260/340.5, 260/340.9, 260/999
[51] Int. Cl............................................ C07c 131/02
[58] Field of Search................................ 260/566 A

[56] References Cited
UNITED STATES PATENTS
3,059,018   10/1962   Johnson et al.................. 260/566 A

*Primary Examiner*—Leon Zitver
*Assistant Examiner*—Gerald A. Schwartz
*Attorney*—Arthur J. Plantamura et al.

[57] ABSTRACT

The nitrosation of $\alpha$-nitrocycloalkanones with alkyl nitrites, nitrogen oxides or nitrosyl halides is advantageously carried out utilizing liquid sulfur dioxide as a reaction solvent. Most advantageously, a strong acid catalyst is also present.

2 Claims, No Drawings

PROCESS FOR THE MANUFACTURE OF KETONE DERIVATIVES

This application is a continuation in part of copending commonly assigned application Ser. No. 852,881, filed Aug. 25, 1969 now abandoned.

BACKGROUND OF THE INVENTION

This invention relates to a process for the nitrosation of α-nitrocycloalkanones, more particularly, to the nitrosation of $C_5$ to $C_{12}$ α-nitrocycloalkanones using liquid sulfur dioxide ($SO_2$) as the nitrosation reaction solvent.

SUMMARY OF THE INVENTION

It has now been found in accordance with the instant invention that $C_5$ to $C_{12}$ α-nitrocycloalkanones can be nitrosated in liquid $SO_2$ to afford the corresponding α-nitro-α'-oximino cyclo-alkanone in very high yield. All other reaction solvents tried afford significantly lower yields of product. However, we have found that the exceptionally high yields obtained in the instant process do not result merely from the use of $SO_2$ as a reaction solvent, but that other reactants must be present and also that certain reaction conditions must be maintained.

Specifically, we have found that to obtain optimum yields the concentration of α-nitrocycloalkanone, hereinafter ANC, in the liquid $SO_2$ reaction solvent must be at least about 10 wt.% and further, that there must be present at least one mole of a $C_1$ to $C_4$ alkanol per mole of ANC. The alkanol can be present either as such or as part of the nitrosating agent molecule as will be more fully explained hereinafter. There should also be present a strong acid catalyst. Under the aforementioned conditions, the initial nitrosation product is not the α-nitro-α'-oximino cycloalkanone, but rather a compound of limited stability which is believed to be a α-nitro-α'-oximino hemi-ketal which is readily transformed into a ketal which is stable, and can be isolated as such or converted to the free α-nitro-α'-oximino cycloalkanone. The nitrosation reaction of the instant invention can be schematically represented as follows:

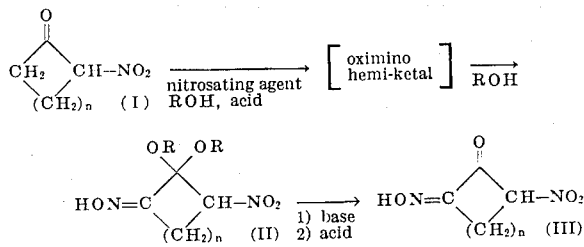

wherein $n$ = 2 to 9 and R connotes a $C_1$ to $C_4$ alkyl group.

As heretofore indicated, $C_5$ to $C_{12}$ α-nitrocycloalkanones are the compounds nitrosated in accordance with the instant invention. These compounds are ordinarily prepared by nitration of the corresponding ketone. Such nitration is most advantageously carried out by forming the enol acylate of the ketone by reaction of the ketone with a carboxylic acid anhydride or with ketene, e.g., using cyclohexanone,

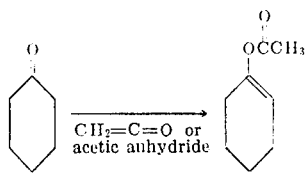

The enol acetate is then nitrated with a nitrating agent such as acetyl nitrate.

Suitable ketones include any of the $C_5$ to $C_{12}$ cycloalkanones such as cyclopentanone, -hexanone, -heptanone, -octanone, -nonanone, -decanone, and -dodecanone, and 4-methyl cyclohexanone.

In carrying out our nitrosation procedure the α-nitrocycloalkanone (I) is dissolved in liquid $SO_2$. The concentration of compound (I) in $SO_2$ should be at least about 10 wt.%, preferably from about 10 to about 50 wt.%, most preferably 15 to 35 wt.%. Concentrations lower than about 10 wt.% result in a significantly reduced yield of the desired product III. In addition to compound I there is dissolved in the liquid $SO_2$ nitrosating agent and $C_1$ to $C_4$ alkanol, ROH. The nitrosating agent and alkanol are preferably added portionwise to the ANC in $SO_2$ solution. However, if desired although it is not preferred, the ANC in $SO_2$ can be added to the nitrosating agent and alkanol either neat or also dissolved in $SO_2$.

Suitable nitrosating agents include the $C_1$ to $C_4$ alkyl nitrites, nitrosyl formate, chloride, or bromide and $N_2O_3$. The preferred nitrosating agent is methyl nitrite or nitrosyl chloride. From about 1.0 to 1.5 moles of nitrosating agent per mole of ANC should be utilized. Lesser amounts reduce the yield of product, while greater amounts provide no improvement in yield, but increase the cost.

Any of the $C_1$ to $C_4$ alkanols, e.g., methanol, ethanol, isopropanol, or n- or t-butanol can appropriately be used. The preferred alkanol is methanol because of its cheapness and volatility. The amount of alkanol which should be added is dependent upon the nitrosating agent chosen. If a nitrosating agent other than a $C_1$ to $C_4$ alkyl nitrite is utilized, at least one mole of ROH per mole of ANC should be added. Yields of hemi-ketal are enhanced if at least about 2.0 moles of ROH per mole of ANC is used. Where a $C_1$ to $C_4$ alkyl nitrite is chosen as the nitrosating agent, each mole of such nitrosating agent is the effective equivalent of one mole of alkanol. Therefore if such alkyl nitrite is utilized as nitrosating agent, no ROH need be added. However, we have found that even when using an alkyl nitrite as the nitrosating agent higher yields of product are obtained when free alkanol ROH is also added. Preferably, at least about 0.5 mole of alkanol per mole of ANC is added. If the R of the alkanol ROH and of the alkyl nitrite RONO are different, a mixture of hemi-ketals may be found, however, this does not affect yield.

We have also found that the nitrosation reaction proceeds more readily and in higher yield in the presence of a strong acid catalyst. Any nonoxidizing acid having a pKa of less than about 1 is suitable such as for example, hydrochloric, hydrobromic, sulfuric, phosphoric, p-toluene sulfonic, or methane sulfonic acid. The amount of acid present in the reaction mixture is not critical but it should preferably be sufficient to provide at least about 4.0 moles of acid per mole of ANC. Because of its high volatility, hydrochloric acid is readily removed from the reaction mixture after completion of the reaction and for this reason it is preferred. The acid can be added prior to or simultaneously with the nitrosating agent, preferably prior to the nitrosating agent.

The temperature at which the solution of α-nitrocycloalkanone in $SO_2$ is preferably maintained during and after addition of the nitrosating agent ranges from about −30° up to +25°C., most preferably −20° to +5°C. Below about −30°C., the nitrosation reaction proceeds at a slow rate. Above about +25°C., side reactions, which reduce yield, tend to occur.

Nitrosation is ordinarily complete within from 1 to 12 hours after the nitrosating agent has been added. With other conditions remaining constant, the higher the temperature the shorter the time required for complete reaction. Completion of the nitrosation reaction can readily be ascertained by vapor phase chromatographic analysis of an aliquot of the reaction mixture if conditions are varied from those having a predetermined completion time. Ordinarily, the nitrosation reaction mixture is worked-up promptly after completion of the nitrosation reaction. Work-up is most conveniently carried out by stripping off the $SO_2$ which boils at −10°C. at atmospheric pressure, any excess nitrosating agent and alkanol and the HCl catalyst under reduced pressure, preferably at a temperature below about 0°C., leaving behind hemi-ketal as a residue. If a nonvolatile acid catalyst is used, it must be removed from the reaction mixture or neutralized prior to removal of the $SO_2$ by stripping.

As heretofore indicated, this hemi-ketal is of limited stability and will slowly decompose if left standing after evaporation of the $SO_2$. In $SO_2$ solution the hemi-ketal is apparently stable indefinitely and hence if desired such solutions can be retained for prolonged periods.

The hemi-ketal residue remaining after stripping off $SO_2$, acid catalyst and any unreacted nitrosating agent and alkanol is then reacted with at least 1.0 mole of $C_1$ to $C_4$ alkanol to afford ketal (II). The hemi-ketal is preferably worked-up by dissolving in $C_1$ to $C_4$ alkanol. The hemi-ketal can be transformed directly into compound III by reaction with water although yields are somewhat lower than those obtained by the two-step reaction sequence described hereinabove. The alkanol used can be the same as or different from that initially present in the reaction mixture or a mixture of alkanols can be used. If a different alkanol from that initially present in the reaction mixture is utilized, then a mixed ketal will be formed, i.e., the two R's in formula II will not be the same. No advantage accrues from using a different alkanol from that initially present, so ordinarily the same alkanol, preferably methanol, will be utilized. The amount of alkanol required to transform the hemi-ketal into the ketal II is one mole of alkanol per mole of hemi-ketal. Ordinarily, however, a large excess of alkanol is used since this facilitates further work-up. The ketal forms immediately on contacting of the hemi-ketal with alkanol at ambient temperature in essentially quantitative yield. If excess alkanol is present the ketal will dissolve as it is formed. It can be recovered in crystalline form by chilling the solution of ketal in alkanol below about 0°C. and decanting or filtering off the mother liquor. Compound II is apparently unique among ketals in that it is stable towards acids but is hydrolyzed by base. This acid stability of the ketal is not only unique but also advantageous since the ketals (II) show fungicidal activity, particularly against rust diseases such as coffee rust, wheat rust, or rice blast. Because of its acid stability, it is therefore compatible with fertilizer formulations, most of which are acidic.

As reported in copending, commonly assigned application Ser. No. 852,881, filed Aug. 25, 1969, the nitro-oximino cycloalkanones (compound III) prepared in accordance with the method of the instant invention are also active against plate fungus diseases, in particular against coffee rust disease.

Ketal (II) is transformed into ketone (III) by hydrolysis with one mole of base which first forms the enol salt of III and then free III on neutralization of the enol salt with acid. This transformation is most expeditiously effected by adding to an aqueous suspension of the ketal at least one equivalent of a base such as an alkali or alkaline earth metal oxide or hydroxide, e.g., sodium hydroxide, per mole of ketal at from approximately ambient temperature up to about 50°C. Alternatively, the ketal can be added to an aqueous solution containing at least one equivalent of base. As above indicated, the ketal is first transformed into the enol salt by the base. Thereafter, neutralization with any strong, non-oxidizing acid such as for example, HCl forms free compound (III) plus the acid salt of the base, e.g., in this instance, sodium chloride. Compound III readily precipitates out of solution and is decanted or filtered off. The salt, e.g. NaCl, remains in the aqueous solution.

Sulfur dioxide is uniquely advantageous as hereinabove enumerated over other possible reaction solvents. In addition to affording compound III in high yield, it is nonflammable, inexpensive, and it is a very good solvent for both reactants and products. Additionally, because of its low boiling point, $SO_2$ can be readily removed at low temperature without the need for provision for vacuum stripping. As heretofore indicated, HCl is the preferred acid catalyst. HCl has a comparatively low solubility in $SO_2$ at atmospheric pressure and a high solubility at pressures above about 5 atmospheres. Therefore, removal of both $SO_2$ and HCl from the hemi-ketal product after completion of the reaction is readily accomplished by allowing the reaction mixture to come to atmospheric pressure at a temperature below about −10°C. causing the HCl to flash off and then allowing the temperature to rise to about −10°C. causing flash-off of the $SO_2$ leaving behind the hemi-ketal product as a residue. This residue can be further reacted without additional purification.

We have found that use of solvents other than liquid $SO_2$ or concentrations of α-nitrocycloalkanone in $SO_2$ if less than 10 wt.%, have numerous disadvantages. Using the two step process of the instant invention, yields of ketone (III) in excess of 90 percent are obtained. Using more dilute solutions in $SO_2$ little ketal II is obtained and the predominant product is ketone III, however, the yield of compound III in dilute solution in $SO_2$ is comparatively low. Likewise in mono or dialkyl ethers or other conventional reaction solvents, the product of nitrosation is compound (III) with little or no ketal (II) being formed. However, the yield of compound III is nonetheless significantly lower than that afforded by the two step process of the instant invention. Other known prior art solvents such as alkanols, halogenated hydrocarbons, or acetic acid also afford compound III in very poor yield.

The invention can be more fully understood by reference to the following examples. All parts are parts by weight unless otherwise expressly noted.

Examples 1 – 3 are comparative examples showing the yields of product obtainable when $SO_2$ is used as a solvent but low concentrations of nitrocyclohexanone reactant in $SO_2$ and no added alkanol ROH are utilized so that the hemi-ketal is not the primary reaction product. The highest yield was 68 percent (Example 2). Example 4 is a close approximation of Example 2, but utilizes the procedure of the instant invention resulting in a much higher yield.

Example 1

Approximately 60 cc of liquid $SO_2$ was saturated with anhydrous HCl at −15°C. and atmospheric pressure. This yielded a solution 0.8 molar in HCl. Three grams of nitrocyclohexanone (0.021 mol) and 1.8 grams (0.03 mol) of methyl nitrite were then added, and the clear red solution which formed kept at −15°C. for 3 hours. The $SO_2$ and HCl were then stripped off while maintaining the reaction mixture below 0°C., and the residue was recrystallized from a small amount of methanol at approximately −10°C. The percentage conversion of nitrocyclohexanone to 2-nitro-6-oximinocyclohexanone was 60 mol percent as determined by vapor phase chromatographic analysis of the reaction mixture for unreacted starting material. The amount of 2-nitro-6-oximino cyclohexanone recovered from the crystallization was 0.64 gram while 0.32 gram was present in the mother liquor. This amounts to a total of 0.96 gram of oximino-nitrocyclohexanone or 44 mol percent based on consumed nitrocyclohexanone starting material.

Example 2

A solution of 1.5 grams (10.5 millimols) of nitrocyclohexanone was dissolved in 33 cc of liquid $SO_2$ and this solution was then saturated with gaseous HCl at −15°C. and approximately 4 atmospheres producing a solution approximately 5 M in HCl. At this point, the solution was cooled to −80°C. and 1.5 grams (25 millimols) of methyl nitrite added. The reaction mixture was brought to reaction temperature of −15°C. ± 2°C. and this temperature maintained for 4 hours. The $SO_2$ and HCl present were removed while maintaining the temperature below 0°C., and the residue was recrystallized from a small amount of methanol. 0.713 Gram of pure crystalline 2-nitro-6-oximino-cyclohexanone was obtained while 0.482 gram of the same product remained in the filtrate. The amount of desired product amounted to 1.20 gram or 68 percent based on 2-nitrocyclohexanone consumed. Vapor phase chromatographic analysis showed that at least 99 mol percent of the starting material, nitrocyclohexanone, had been consumed.

Example 3

To a solution of 1.5 gram (10.5 millimols) of nitrocyclohexanone in 33 cc liquid $SO_2$, which had been saturated with HCl to give a 4.4 molar solution, was added 1.1 grams (17.0 millimols) of nitrosyl chloride while the temperature was maintained at −78°C. The mixture was then allowed to warm up to about −15°C. and maintained at this temperature for 3.5 hours. The pressure was 37 psig. The volatiles (unreacted NOCl, $SO_2$ and HCl) were removed by flash distillation at a temperature below 0°C. The residue was recrystallized from a small amount of methanol at −10°C.

The conversion of nitrocyclohexanone was 43.5 percent. 76.5 milligrams of crystalline 2-nitro-6-oximinocyclohexanone was obtained from the methanol recrystallization while an additional 150 mg. was present in the mother liquor. The total amount of 2-nitro-6-oximinocyclohexanone was 227 mg. or 29 mol percent of theory based on consumed 2-nitrocyclohexanone.

Example 4

A solution of 9.0 grams of nitrocyclohexanone was dissolved in 33 cc of liquid $SO_2$ and this solution was then saturated with gaseous HCl at −15°C. and approximately 4 atmospheres producing a solution approximately 5 M in HCl. At this point, the solution was cooled to −80°C. and 9.0 grams of methyl nitrite and 4.8 g of $CH_3OH$ added. The reaction mixture was brought to reaction temperature of −15°C. ± 2°C. and this temperature maintained for 4 hours. The $SO_2$, $CH_3OH$ and HCl present were then removed while maintaining the temperature below 0°C. The crude residue was dissolved in 50 cc of methanol at 35°C. and the solution then cooled to 0°C. affording white crystals which were collected by suction filtration. Additional crystals were obtained by adding 50 cc water to the mother liquors. The combined crystals were then shaken for 3 hours at 40°C. with 20 cc of 5N aqueous NaOH and the thereby resulting solution then neutralized with 5N HCl affording a white precipitate of 2-nitro-6-oximino cyclohexanone which was collected by suction filtration, washed with distilled water and dried in vacuo. Yield of product was 9.7 g = 90 percent.

Examples 5 – 26

The reaction vessel utilized was a glass-lined pressure vessel fitted with a Monel pressure gauge and valve and internal magnetically actuated stirring means. In a typical run, 10 parts of α-nitrocyclohexanone (hereinafter ANC) were charged to the reaction vessel which was then cooled to −78°C. and liquid $SO_2$ in the desired quantity fed in. In those instances where acid catalyst and/or alkanol were being used, they were added to the chilled vessel immediately after the $SO_2$. Finally, the nitrosating agent was added. The vessel was sealed and warmed to the desired reaction temperature where it was maintained for ½ to 12 hours. The reaction mixture was then vacuum stripped on a rotary evaporator at −15°C. affording hemi-ketal. Then 100 parts of cold methanol was added to the evaporation residue resulting in the formation of white crystals of the ketal (compound II) which were collected by filtration and washed with cold methanol. Additional ketal crystals were obtained by adding an equal volume of water to the mother liquor and cooling. Yields given in the table below are for the combined crops of ketal crystals. The combined crystals were dissolved in 50 parts of 2N aqueous alkali at about 40°C. After brief standing at this temperature, this reaction mixture was neutralized by pouring into 50 parts of cold 2N HCl resulting in the immediate formation of pale yellow crystals of compound III. These crystals were collected by suction filtration, washed with cold water, dried in vacuo and the yield thereof determined. Evaporation of the mother liquor afforded essentially no additional product. The yield of compound III was in all cases approximately 96 percent of the yield of ketal.

Results for the above series of experiments are tabulated below.

| Example | Nitrosating agent and moles thereof/mole ANC | Moles HCl/ moles ANC | Parts SO$_2$/ parts ANC | Moles MeOH/ mole ANC | Nitrosation reaction temp. °C. and time | Yield of ketal |
|---|---|---|---|---|---|---|
| 5 | MeONO, 1.25 | 6.0 | 4.0 | 1.0 | −15°, 1 hr | 93 |
| 6 | MeONO, 1.5 | 6.0 | 4.0 | 1.0 | do | 94 |
| 7 | MeONO, 2.5 | 6.0 | 4.0 | 1.0 | do | 93 |
| 8 | MeONO, 1.0 | 6.0 | 4.0 | 1.0 | do | 85 |
| 9 | NOCl, 1.5 | 6.0 | 4.0 | 1.0 | do | 86 |
| 10 | do | 6.0 | 4.0 | 0 | do | 0 |
| 11 | do | 6.0 | 4.0 | 2.0 | do | 89 |
| 12 | NOCl, 1.0 | 6.0 | 4.0 | 2.0 | do | 84 |
| 13 | N$_2$O$_3$, 1.5 | 6.0 | 4.0 | 1.0 | do | 74 |
| 14 | MeONO, 1.5 | 2.0 | 4.0 | 1.0 | do | 0 |
| 15 | do | 3.0 | 4.0 | 1.0 | do | 40 |
| 16 | do | 5.0 | 4.0 | 1.0 | do | 87 |
| 17 | do | 10.0 | 4.0 | 1.0 | do | 93 |
| 18 | do | 6.0 | 2.0 | 1.0 | do | 69 |
| 19 | do | 6.0 | 3.0 | 1.0 | do | 91 |
| 20 | do | 6.0 | 4.0 | 0 | do | 80 |
| 21 | MeONO, 2.0 | 6.0 | 4.0 | 1.0 | do | 92 |
| 22 | MeONO, 1.5 | 6.0 | 4.0 | 0.5 | do | 92 |
| 23 | do | 6.0 | 4.0 | 2.0 | do | 93 |
| 24 | do | 6.0 | 4.0 | [1]1.5 | do | [1]90 |
| 25 | do | 6.0 | 4.0 | 1.5 | 0°, 0.5 hr | 85 |
| 26 | do | 6.0 | 4.0 | 1.5 | −30°, 4 hrs | 90 |

[1] i-PrOH used instead of methanol and mixed hemi-ketal obtained, i.e. part of R was Me from MeONO and part i-Pr from i-PrOH.

Example 27

The procedure of Example 5 was followed up to the point where the hemi-ketal was obtained by stripping of the reaction mixture. This was added with stirring to 50 parts of water at 0°C. Stirring was continued for 10 min. after which the crystalline product suspended in the water was collected by suction filtration, dried in vacuo, weighed and analyzed by NMR and I.R. The product was a mixture of compound III and ketal.

Example 28

Alcoholysis of NOC-Dimethyl Ketal

NOC-dimethyl ketal, 2.19 g (10 mmole) was added to 6.5 g (100 mmole) ethylene glycol, which contained 0.10 g (2.5 mmole) of dry sodium hydroxide. The mixture was heated to 70°C. and maintained at this temperature for one hour while a slow stream of nitrogen was bubbled through it in order to remove methanol. Then the reaction mixture was cooled to 5°C. and 15 ml of cold 0.33 N hydrochloric acid (5 mmole) was added in one shot with good stirring. White crystals precipitated which were filtered after standing for ten minutes and then washed with 25 ml of cold water. Yield 2.11 g of NOC-ethylene ketal, m.p. 188°–192°C. (97 percent of theory). GLC analysis [after silylization] showed no unreacted NOC-dimethyl ketal in the product or in the mother liquor. The melting point of the product did not change after recrystallization from methanol/water (88 percent recovery).

The ketal (compound II) can, of course, have its R groups exchanged by other mono or dihydroxy alcohols in addition to ethylene glycol. Essentially any mono or dihydroxy alcohol having a boiling point greater than methanol can replace CH$_3$ as the R groups in compound III. Suitable mono hydroxy alcohols include the C$_2$ to C$_{24}$ alkanols and the C$_5$ to C$_{12}$ alicyclic alcohols. Suitable glycols include α,β-dihydroxy cycloalkanes having at least 5 carbons and vicinal-dihydroxy alkanes from C$_2$ to C$_{12}$. The ketal would then have the formula

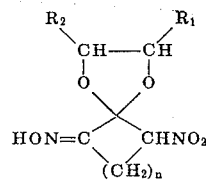

wherein R$_1$ and R$_2$ can be hydrogen, or an alkyl group of up to 10 carbons with R$_1$ plus R$_2$ having a total of 1 to 10 carbons when alcoholysis is effected using an α-β-dihydroxy alkane, and the formula

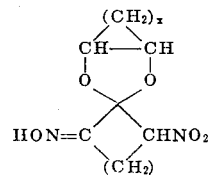

wherein X is at least 3 when using α-β-dihydroxy cycloalkanes.

We claim:

1. A compound of the structure:

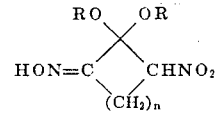

wherein $n$ is an integer from 2 to 9, and wherein each R is independently a C$_1$ to C$_4$ alkyl group.

2. A compound in accordance with claim 1 wherein $n=3$ and both R's are methyl.

* * * * *